US010268476B2

(12) United States Patent
Raundahl Gregersen et al.

(10) Patent No.: US 10,268,476 B2
(45) Date of Patent: *Apr. 23, 2019

(54) SYSTEM AND METHOD FOR FAST RESTARTING OF USER APPS

(71) Applicant: ZeroTurnaround AS, Tartu (EE)

(72) Inventors: Allan Raundahl Gregersen, Odense SV (DK); Rein Raudjärv, Tartu (EE); Madis Pink, Tartu (EE)

(73) Assignee: ZeroTurnaround AS, Tartu (EE)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,996

(22) Filed: Mar. 18, 2016

(65) Prior Publication Data

US 2016/0274900 A1 Sep. 22, 2016

Related U.S. Application Data

(60) Provisional application No. 62/135,964, filed on Mar. 20, 2015.

(51) Int. Cl.
*G06F 9/44* (2018.01)
*G06F 8/658* (2018.01)
*G06F 16/11* (2019.01)
*G06F 8/65* (2018.01)
*G06F 9/445* (2018.01)

(52) U.S. Cl.
CPC ............... *G06F 8/658* (2018.02); *G06F 8/65* (2013.01); *G06F 9/44521* (2013.01); *G06F 16/113* (2019.01)

(58) Field of Classification Search
None
See application file for complete search history.

(56) References Cited

U.S. PATENT DOCUMENTS

| 10,146,522 B1* | 12/2018 | Sundresh | G06F 8/65 |
| 2012/0036552 A1* | 2/2012 | Dare | H04L 41/0253 726/1 |
| 2015/0370551 A1* | 12/2015 | Mahajan | G06F 8/43 717/170 |
| 2016/0087953 A1* | 3/2016 | Aamir | H04L 63/08 726/1 |

OTHER PUBLICATIONS

Kabanov, "Reloading Java Classes 401: HotSwap and JRebel—Behind the Scenes", Feb. 11, 2010,Zeroturnaround,pp. 1-13 (Year: 2010).*

* cited by examiner

*Primary Examiner* — Duy Khuong T Nguyen
(74) *Attorney, Agent, or Firm* — HoustonHogle LLP

(57) ABSTRACT

A system and method for fast restart of user apps on a user device. A host system hosts classes and resources of the user app, and a service app host application on the host system deploys an initial instance of the user app on the user device that includes additional instrumentation for enabling the user app to be quickly restarted on the user device with a set of changed classes and/or changed resources that comprise the latest version of the user app during development of the user app. This can significantly reduce the typically long turnaround time when developing and testing user apps as compared to current systems and methods. In a preferred embodiment, the system enables a fast restart of user apps running on Android user devices.

21 Claims, 10 Drawing Sheets

SYSTEM AND METHOD FOR FAST RESTARTING OF USER APPS

RELATED APPLICATIONS

This application claims the benefit under 35 U.S.C. § 119(e) of U.S. Provisional Application No. 62/135,964, filed on Mar. 20, 2015, which is incorporated herein by reference in its entirety.

BACKGROUND OF THE INVENTION

User devices is a term that applies to computer systems such as desktop computers, smart televisions (TVs) and mobile computing devices such as laptop computers, mobile phones, tablets, "smart" watches, and glasses, to list a few examples.

Software that runs on the user devices can be generally classified as operating systems and software applications. The operating system manages the physical elements or hardware of the user devices such as its central processing unit (CPU) and peripherals. The operating system also presents well-defined Application Programming Interfaces (APIs) to the software applications. The software applications interact with the hardware of the user devices and can access its capabilities via the APIs of the operating system.

Software applications that interact with an operating system are also said to "run on top of" the operating system. Applications that run directly on top of an operating system are also known as native applications. One such software application is a virtual machine (VM).

VMs permit an isolated processing environment to exist on a user device. VMs present this isolated processing environment to other software applications that execute on top of the VMs. The VMs hide or abstract the details of the underlying hardware and/or operating system from the applications that run on top of the VMs. Applications that run on top of VMs of user devices are also known as user apps, or "apps." Applications that run on top of VMs of host systems are also known as host applications.

Host systems are computer systems that developers use to develop the user apps and prepare the user apps for execution on the user devices. Developers use host applications and native applications on the host systems to develop and compile the source code of the user apps. The host systems, as their name implies, host the files that include the source code of the user apps and the compiled output. The compiled output is then installed on a user device and executed to run the user app on the user device. Often, the source code of the user apps is written using the Java programming language.

Java is a registered trademark of Oracle Corporation. Java source code is included within classes, and a Java compiler converts the source code for each Java class definition into its compiled output, also known as bytecode. Bytecode is typically a set of binary files that include platform-neutral instructions for implementing application behavior. Bytecode executes on VMs. The VMs interpret the bytecode, and execute corresponding native (e.g. machine-dependent) instructions on the target user device associated with the bytecode.

For example, a Java compiler accepts a source file named "MyClass.java" with source code that includes the class definition for named class "MyClass," converts the source code to bytecode, and stores the bytecode in class file "MyClass.class."

The term "platform" typically refers to an operating system of a user device or other computer system. One such platform is the Android platform. Android is a registered trademark of Google, Inc. Android is a mobile computing system operating system based on the Linux kernel. User devices that support the Android platform/OS are also known as Android user devices.

User apps that extend the functionality of Android devices are developed primarily in the Java programming language. Dalvik and ART are examples of Android-specific VMs upon which user apps execute.

The Dalvik VM cannot execute java bytecode directly. Dalvik requires that the java bytecode is first converted into a further form of Android-specific set of instructions known as Dalvik bytecode/Dalvik executable. Dalvik bytecode is stored in files having a ".dex" extension. A tool called "dx" is used to convert Java .class files into the .dex files. For this reason, Android user app developers often use terminology such as "Android user apps are compiled into dex files" as a shorthand for this process.

ART (Android Runtime) is a newer VM for Android that improves upon Dalvik. ART accepts dex files to maintain backwards compatibility to Dalvik. In addition, a new Android development tools suite called the Java Android Compiler Kit (Jack) can directly produce dex files from Java source code.

Resources are the non-source code additional files and static content used by a user app. Android resources include content such as layout definitions, user interface strings, plaintext and binary XML files, graphics files such as JPEG and bitmap images, and animation instructions, in examples. Resources are typically compiled into a binary format before they are packaged within the APK file. They can be accessed from code via unique resource ids for each of the resources.

Archives are files that include one or more computer files and optionally meta data of the computer files. The computer files can include text, or information in binary format, in examples. Archives are typically compressed to enable more efficient use of storage space of computer systems that store the archives. Archives also enable more efficient transfer of files when packaged within an archive, as compared to transfer of the individual files in uncompressed (i.e. "raw") format. Examples of archives, and computer files included within the archives, include java class files included within a java archive, or JAR files, and dex files included within an Android application package (APK) archive.

Android application package (APK) is the package file format used to distribute and install application software and middleware onto Android user devices. It is an archive that is formatted in a fashion similar to ZIP and JAR archives. A typical APK includes an Android manifest file and sets of dex files and resources associated with the Android user app.

Deployment of a user app refers to the steps required to install and execute the user app on a user device. In the case of Android user apps, deployment is associated with sending an APK for the user app to the user device, unpacking the contents of the APK, and loading the classes and/or resources of the user app from the unpacked contents to execute/start the user app on the user device.

Class transformation is the process of modifying the bytecode of original classes and changed classes of an application such as a user app or host application. Class transformation techniques enable changes to the behavior of a user app without making changes to its original source code and/or resources. Class transformation is typically executed offline.

Android Instrumentation is a mechanism for hooking into the main lifecycle events of an Android user app. When a user app is running with instrumentation turned on, any Implementation classes of the user app will be instantiated before any other classes of the application code. This allows monitoring of all interactions that the Android platform has with the user app.

A class inheriting from an Android Activity class provides an atomic, focused event. Almost all Android activities enable interactions with the user. In one example, Activity classes can create a main graphical window within which a user interface (UI) can be placed, typically by means of Android resources.

Current methods of developing user apps for user devices have problems. One problem is the significant amount of time required to make changes to a user app and to then test the changes. This is known as the turnaround time.

Long turnaround time is a major issue for developing user apps on user devices such as Android user devices. Turnaround time includes the time associated with each change and retest of a user app, also known as a compile-uninstall-deploy-start cycle.

For each cycle, on a development system, developers first make changes to the source code and/resources of the user app and compile the changes. The changes to the classes and/or the resources are saved to a host file system of the developer system. A new archive is then created that includes the original classes and resources of the user app and the changes. Then, on the user device, the currently running instance of the user app is stopped, and its current archive/package file is uninstalled. The developer then deploys the new archive on the user device by unpacking its contents, and executing its unpacked contents to start the user app.

Typically, development of a user app requires applying hundreds or even thousands of these cycles in an iterative fashion. Turnaround time generally increases proportionally with the size of the user app being developed. While the turnaround time can be especially long when initially developing a user app, additions or bug fixes to an already released user app can also have significant turnaround times.

A few projects to date have been created in an attempt to address the problem of long turnaround time of user apps, but introduce more problems than they solve and therefore have little practical benefit. One project is Buck Exopackage by Facebook, and another is Mirror by Jimulabs.

Buck Exopackage provides the ability to load classes including application code of the user app at runtime, but has a number of problems. It has an intrusive setup that requires modification of the original production source code of the user app to leverage its features. This pollutes the production code of the user app. It also does not support changes to resources, and is limited to one software development build system for Android, the Buck build system. Finally, it requires extensive changes to build files.

Mirror provides the ability to prototype animation in UIs of Android user apps but has many limitations. While it can preview changes in resources of the user apps, it does not support changes to application code in classes and only supports previews of resource changes shown on the user device. This places the user app in a non-functional state.

SUMMARY OF THE INVENTION

As a result, current projects such as Buck and Mirror do not provide a practical turnaround time improvement solution for general Android development.

The present invention relates to the ability to perform a fast restart of Android user apps during development. More particularly, the present invention can enable an already running Android user app to be quickly restarted with a set of changed classes and/or changed resources that constitute the latest version of the user app during development.

Unlike current approaches for addressing the turnaround time of user apps, the inventive system need not make changes to the source code of the user app, and can support runtime changes of both classes and resources. In a preferred embodiment, the system intercepts class and resource loading on the Android Platform, and replaces the standard/parent class loader and resource manager to enable custom loading of changed classes and/or resources without the need to re-install the user app on the user device.

The present invention can provide a solution to the turnaround time problem without requiring any modifications to user app source code, build files, or projects files. Embodiments can automatically detect changes to the classes and/or resources of the user app hosted on a host system, send the changes to the classes and/or resources to the user device, and restart the user app on the user device by loading only the changes to the classes and by requesting only the detected changes to the resources.

In general, according to one aspect, the invention features a method for updating a user app deployed on a user device. The method includes creating restart classes archives for changed classes and/or new classes of the user app and sending the restart classes archives to the user device, and creating restart resources archives for changed resources and/or new resources of the user app and sending the restart resources archives to the user device. The method also includes the user app reloading the changed classes and/or new classes from the received restart classes archives and requesting the changed resources and/or new resources from the received resources archives on the user device.

Typically, the restart classes archives for the changed classes and/or new classes of the user app are created in response to detecting the changed classes and/or new classes on a host system. In a similar fashion, the restart resources archives for the changed resources and/or new resources of the user app are created in response to detecting the changed resources and/or new resources on a host system.

The invention additionally detects the changed classes and/or new classes of the user app and detects the changed resources and/or new resources of the user app, in response to a user-driven triggering event, and/or in response to receiving events associated with changes to a workspace that includes the classes and resources of the user app. Preferably, a runtime agent of an initial instance of the user app deployed on the user device accomplishes the reloading of the changed classes and/or new classes from the received restart classes archives and accomplishes the requesting of the changed resources and/or new resources from the received resources archives on the user device.

In one implementation, the user app reloading the changed classes and/or new classes from the received restart classes archives and requesting the changed resources and/or new resources from the received resources archives on the user device comprises a runtime agent of an initial instance of the user app deployed on the user device unpacking the changed classes and/or new classes, and unpacking the changed resources and/or new resources, to a device file system of the user device. In response to the runtime agent receiving a restart signal from a host system, the runtime agent then reloads the changed classes and/or new classes, and requests the changed resources and/or new resources from the device file system.

The invention additionally creates a modified user app archive including original classes and original resources of the user app and including classes of a runtime agent of the user app, sends the modified user app archive to the user device, and deploys a modified user app on the user device via the modified user app archive to accomplish deploying of an initial instance of the user app on the user device. In a preferred embodiment, a runtime agent of the user app is deployed on the user device from the classes of the runtime agent, where the runtime agent enables the updating of the user app on the user device after the deployment of the initial instance of the user app on the user device.

It is another aspect to include a new Android Instrumentation target for a Restart Implementation class within the classes of the runtime agent, and to include a replacement android.app.Activity class within the classes of the runtime agent.

In one implementation, the method replaces bytecode of declarations within the original classes that declare android.app.Activity as a super class, with bytecode that declares a replacement restart activity class of the runtime agent as a super class, where the replacement restart activity class overrides a method "attachBaseContext( )" declared within a super class hierarchy of each of the original classes. In a similar vein, the method also replaces bytecode of the changed classes and/or new classes that declare android.app.Activity as a super class, with bytecode that declares a replacement restart activity class of a runtime agent as a super class, where the injected restart activity class overrides a method "attachBaseContext( )" declared within a super class hierarchy of each of the changed and/or new classes.

Preferably, the method updates a user app deployed on an Android user device.

In general, according to another aspect, the invention features a method for a runtime agent of a user app that enables updating of the user app on an Android user device. The method comprises including classes that implement the runtime agent in an modified archive of the user app, modifying classes of an initial instance of the user app to replace declarations of "android.app.Activity" as a super class with declarations of a replacement restart activity class of the runtime agent as a super class, appending resources of the initial instance of the user app and the modified classes of the initial instance of the user app to the modified archive of the user app, and deploying the initial instance of the user app and the runtime agent on the user device via the modified archive of the user app.

Preferably, the method further comprises determining changed classes and/or new classes of the user app and determining changed resources and/or new resources of the user app, modifying the changed classes and/or new classes to replace declarations of "android.app.Activity" as a super class with declarations of a replacement restart activity class of the runtime agent as a super class, including the changed classes and/or new classes and the changed resources and/or new resources in restart archives, and deploying the restart archives on the user device to update the user app with the changed classes and/or new classes and with the changed resources and/or new resources.

In general, according to yet another aspect, the invention features a system for updating a user app deployed on a user device. The system includes a host system creating restart classes archives for changed classes and/or new classes of the user app and sending the restart classes archives to the user device, the host system creating restart resources archives for changed resources and/or new resources of the user app and sending the restart resources archives to the user device. The user app then reloads the changed classes and/or new classes from the received restart classes archives and requests the changed resources and/or new resources from the received resources archives on the user device. Preferably, a service app of the host system creates the restart classes archives for the changed classes and/or new classes of the user app in response to detecting the changed classes and/or new classes on the host system. The service app also creates the restart resources archives for the changed resources and/or new resources of the user app in response to detecting the changed resources and/or new resources on the host system.

In a preferred embodiment, a runtime agent of an initial instance of the user app deployed on the user device accomplishes the reloading of the changed classes and/or new classes from the received restart classes archives and accomplishes the requesting of the changed resources and/or new resources from the received resources archives on the user device.

Typically, the runtime agent of the initial instance of the user app deployed on the user device unpacks the changed classes and/or new classes and unpacks the changed resources and/or new resources to a device file system of the user device. Then, in response to the runtime agent receiving a restart signal from the host system, the runtime agent reloads the changed classes and/or new classes from the device file system and requests the changed resources and/or new resources from the device file system.

Preferably, the host system additionally creates a modified user app archive that includes original classes and original resources of the user app and includes classes of a runtime agent of the user app, sends the modified user app archive to the user device, and deploys a modified user app on the user device via the modified user app archive to accomplish deploying of an initial instance of the user app on the user device.

The host system preferably deploys a runtime agent of the user app on the user device from the classes of the runtime agent, wherein the runtime agent enables the updating of the user app on the user device after the deployment of the initial instance of the user app on the user device.

In general, according to still another aspect, the invention features a method for redeploying a user app on a user device. The method comprises creating an modified user app archive that includes original classes and original resources of the user app and includes classes of a runtime agent of the user app, injecting bytecode into at least some of the original classes to create modified versions of at least some of the original classes, where the bytecode references the classes of the runtime agent, including the modified versions of the at least some of the original classes in the modified user app archive, and deploying an initial instance of the user app and deploying the runtime agent on the user device via the modified user app archive. The runtime agent of the user app then restarts the user app with changed classes and/or new classes of the user app included in restart classes archives sent to the user device and with changed resources and/or new resources of the user app included in restart resources archives sent to the user device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has you been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

It should be understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Figure 1:
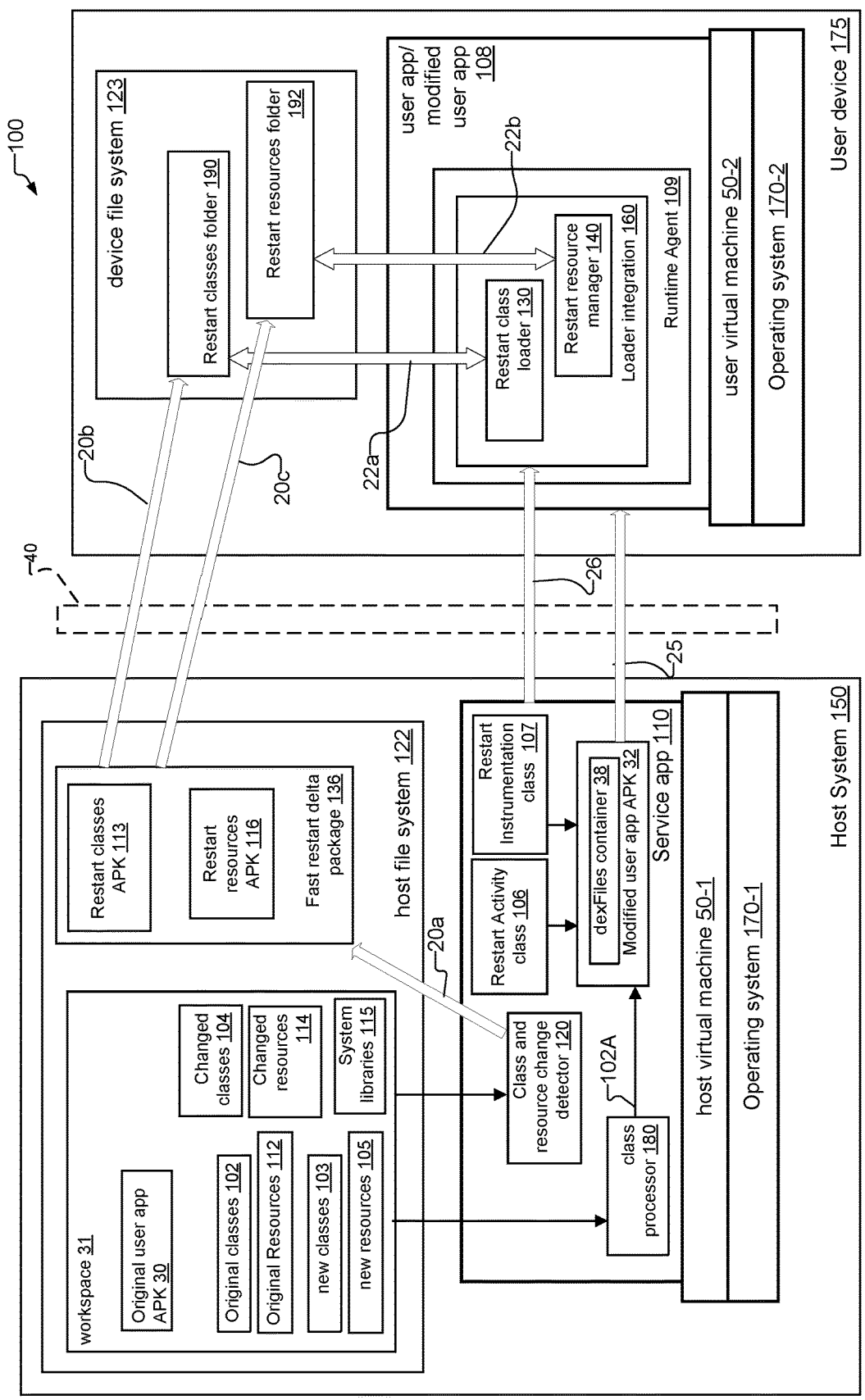
FIG. 1 is a schematic diagram showing a preferred embodiment of a fast restart system that includes an inventive service module host application (service app) running on a host system.

FIG. 1 shows a preferred embodiment of a fast restart system 100 that provides fast restarting of user apps running/executing on an Android user device. The fast restart system 100 includes a host system 150 that communicates with a user device 175 over a communications channel 40.

The host system 150 includes an operating system 170-1 and a host virtual machine 50-1 that runs on top of the operating system 170-1. The host system 150 also includes a service app host application (service app) 110 and a host file system 122.

The host file system 122 includes a workspace 31. The workspace 31 includes classes and resources of a user app 108. The classes include original classes 102, new classes 103, changed classes 104, and system libraries 115, in examples. The resources include original resources 112, new resources 105, and changed resources 114.

The service app 110 preferably runs on top of the host virtual machine 50-1. The service app 110 includes a class processor 180 and a class and resource change detector 120. The service app 110 also includes a Restart Activity class 106 and a Restart Instrumentation class 107. In another implementation, the service app 110 is a native application that runs on top of the operating system 170-1 directly.

The user device 175 includes an operating system 170-2 and a user virtual machine 50-2 that runs on top of the operating system 170-2. One or more user apps 108 run on top of the user virtual machine 50-2. The user device 175 also includes a device file system 123.

Developers on the host system 150 create source code and utilize resources to implement the desired function and behavior of the user apps 108. For each user app 108, developers create an original archive associated with an initial instance of the user app 108 for execution on the user device 175. The original archive includes the original classes 102, the original resources 112, and associated system libraries 115. Reference 30 shows the original archive, which in the preferred embodiment is an original user app APK 30 created for an Android user app 108 for execution/deployment upon an Android user device 175.

However, the system 100 does not necessarily use the original user app APK 30 to deploy the initial instance of the user app 108. Instead, the illustrated embodiment creates a modified archive of the user app, also known as a modified user app archive, which in the preferred embodiment is a modified user app APK 32 created for an Android user app. The modified user app APK 32 provides equivalent functionality to that provided by the original user app APK 30, and includes additional functionality to enable fast restart of user apps when the user apps 108 are initially deployed via the modified user app APK 32.

The modified user app APK 32 includes the original classes and resources 102/112, includes additional classes that implement the runtime agent 109, and includes modified versions of at least some of the original classes 102. The classes that implement the runtime agent 109 include the Restart Activity class 106 and the Restart Instrumentation class 107. The runtime agent 109 instruments a fast restart capability of the user app 108. Via the class processor 180, the service app 110 modifies at least some of the original classes 102 by injecting bytecode into the original classes 102 that references the runtime agent 109. The bytecode that is injected references the Restart Activity class 106 and the Restart Instrumentation class 107. The modified user app APK 32 including the classes and resources of the user app 108 and the runtime agent 109 is then sent to the user device 175 over the communications channel 40. This is indicated by arrow 25.

In the preferred embodiment of an Android user app 108, the classes and resources of the modified user app APK 32 are further converted to the dex file executable format suitable for the Dalvik virtual machine 50. The dex files are then typically aggregated into one or more dexFile containers 38 that include the individual dex files and arrange the dex files in a specific order.

An initial instance of the user app 108 is then deployed on the user device via deployment of a modified user app from the modified user app APK 32 on the user device 175. For this reason, reference number "108" is used interchangeably to reference the user app and the modified user app on the user device 175.

The runtime agent 109 of the user app 108 is created/deployed when the initial instance of the user app 108 is first deployed on the user device 175. The runtime agent 109 includes a loader integration 160, which in turn includes a restart class loader 130 and a restart resource manager 140. The restart class loader 130 has a class path that includes the location of a restart classes folder 190 on the device file system 123. The restart resource manager 140 has a class path that includes the location of a restart resources folder 192 on the device file system 123. The runtime agent 109 then listens for a fast restart signal from the service app 110.

On the host system 150, via the class and resource change detector 120, the service app 110 additionally detects changes to the original classes 102 and/or original resources 112 in the workspace 31. When developers modify the source code of the original classes 102 and then compile the modified sources or modify the original resources 112, the class and resource change detector 120 detects the associated changed classes 104 and changed resources 114. The class and resource change detector 120 also detects new classes and resources 103/105 added to the workspace 31.

In one example, the class and resource change detector 120 is triggered by listening for file system events on the host system 150. In this example, the class and resource change detector 120 will detect any changes to classes and resources within the workspace 31 by receiving events associated with changed files. Typically, this is implemented by registering operation-specific event listeners that will fire (i.e. respond) when the event listeners receive events associated with changes to the workspace 31. In another example, the class and resource change detector 120 can be triggered via a user-driven triggering event from an integrated development environment (IDE) which is commonly used to develop applications/user apps 108. This trigger mode is particularly beneficial, since often the developers would know when the classes and resources under modification are in a consistent state. Hence, the developer can make a qualified judgement regarding when to best trigger the class and resource change detector 120 to detect if any new/changed classes 103/104 or any new/changed resources 105/114 exist within the workspace 31. In one example, the user-driven triggering event is accomplished by a developer using the IDE to change the state of a global variable, where the class and resource change detector 120 is triggered in response to the state change of the global variable.

Regardless of how the class and resource change detector 120 is triggered, in response to detecting the new/changed classes 103/104 and/or detecting the new/changed resources 105/114, the class and resource change detector 120 then creates a restart classes archive and/or a restart resources archive. The restart classes archive includes all new/changed classes 103/104, and the restart resources archive includes all new/changed resources 114/115. Then, the class and resource change detector 120 creates a fast restart delta package 136 on the host file system 122 that includes the restart classes archive and the restart resources archive. This is indicated by arrow 20a. As a result, the restart classes archive includes updates to the classes of the currently running instance of the user app 108 (e.g. changed classes and/or new classes 104/103) and the restart resources archive includes updates to the resources of the currently running user app 108 (e.g. changed resources and/or new resources 114/105).

In the preferred embodiment for Android user apps 108, the restart classes archive is also known as a restart classes APK 113 and the restart resources archive is also known as a restart resources APK 116. References 113 and 116 show the restart archives included within the fast restart delta packages 136. The restart classes APK 113 includes the new/changed classes 103/104 and the restart resources APK 116 includes the new/changed resources 105/114, in examples. Finally, the service app 110 sends the fast restart delta package 136 to be installed on the user device 175.

In the preferred embodiment of an Android user app 108 for deployment on an Android user device 175, the classes and resources of the restart resources APK 116 and the restart resources APK 116 are further converted to the dex file executable format suitable for the Dalvik virtual machine 50. The dex files are then typically aggregated into one or more dexFile containers 38 that include the individual dex files and arrange the dex files in a specific order.

On the user device 175, the fast restart delta package 136 is unpacked to the device file system 123 by the runtime agent 109. The new/changed classes 103/104 of the restart classes APK 113 are unpacked to the restart classes folder 190 as indicated by arrow 20b, and the new/changed resources 105/114 of the restart resources APK 116 are unpacked to the restart resources folder 192 as indicated by arrow 20c.

When the user device is an Android user device, the new/changed classes 103/104 of the restart classes APK 113 are dex files. In this case, the runtime agent 109 executes additional processing upon the new/changed classes 103/104 unpacked to the restart class folder 190 on the user device 175 to strip prior versions of changed classes in previous dex files and to optimize the dex files as required, in accordance with typical Android VM dex file optimization behavior.

The service app 110 communicates directly with the runtime agent 109 via the communications channel 40. When the runtime agent 109 receives a fast restart signal over the communications channel 40 from the service app 110, the runtime agent 109 immediately restarts the user app 108 using the Restart Instrumentation class 107. During startup, code within the Restart Instrumentation class 107 replaces the standard class loader of the user virtual machine 50-2 with the restart class loader 130, and replaces the standard resource loader of the user virtual machine 50-2 with the restart resource manager 140.

The execution flow is then handed back to the user app 108, which is restarted with the classes loaded by the restart class loader 130 from the restart classes folder 190, and is restarted with the resources requested by the restart resource manager 140 from the restart resources folder 192. In this way, the user app 108 is restarted by loading the "deltas" or updates to the classes detected since the last restart of the user app 108 and by requesting the updates to the resources detected since the last restart of the user app 108, in addition to loading the original classes 102 and the original resources 112 that have not been changed.

Figure 2A:
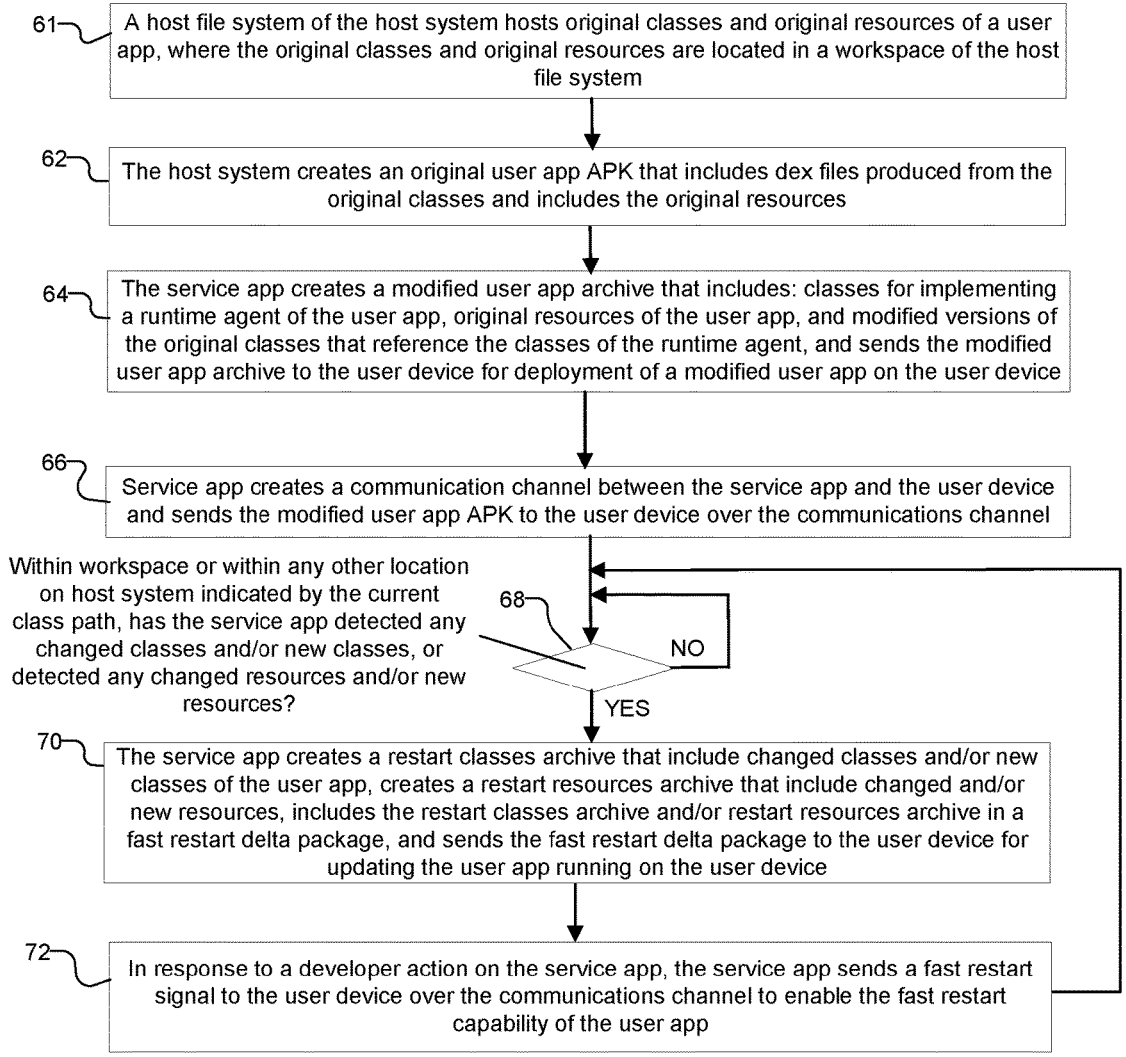
FIG. 2A is a flowchart showing a method of operation of the service app, where the method shows how the service app: prepares classes of an initial instance of the user app that additionally includes instrumentation for enabling fast restart of the user app, deploys the initial instance of the user app on the user device, prepares restart archives that include updates to the user app and sends the restart archives to the user device, and sends a signal to the user app to trigger the updating of the user app with the contents of the restart archives.
Figure 2B:
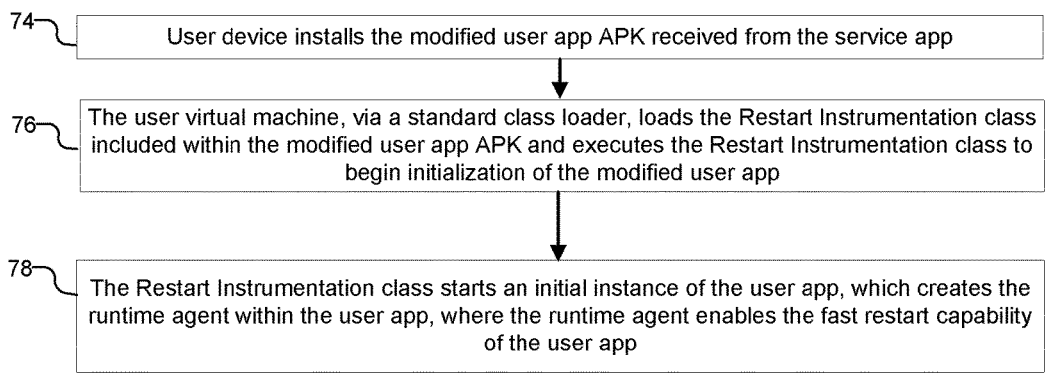
FIG. 2B is a flowchart showing details for deploying an initial instance of the user app on the user device, by deploying a modified user app from a modified user app archive created in FIG. 2A, where the modified user app archive includes original classes and resources of the user app and classes of a runtime agent, and where the classes of the runtime agent implement the fast restart instrumentation of the user app.
Figure 2C:
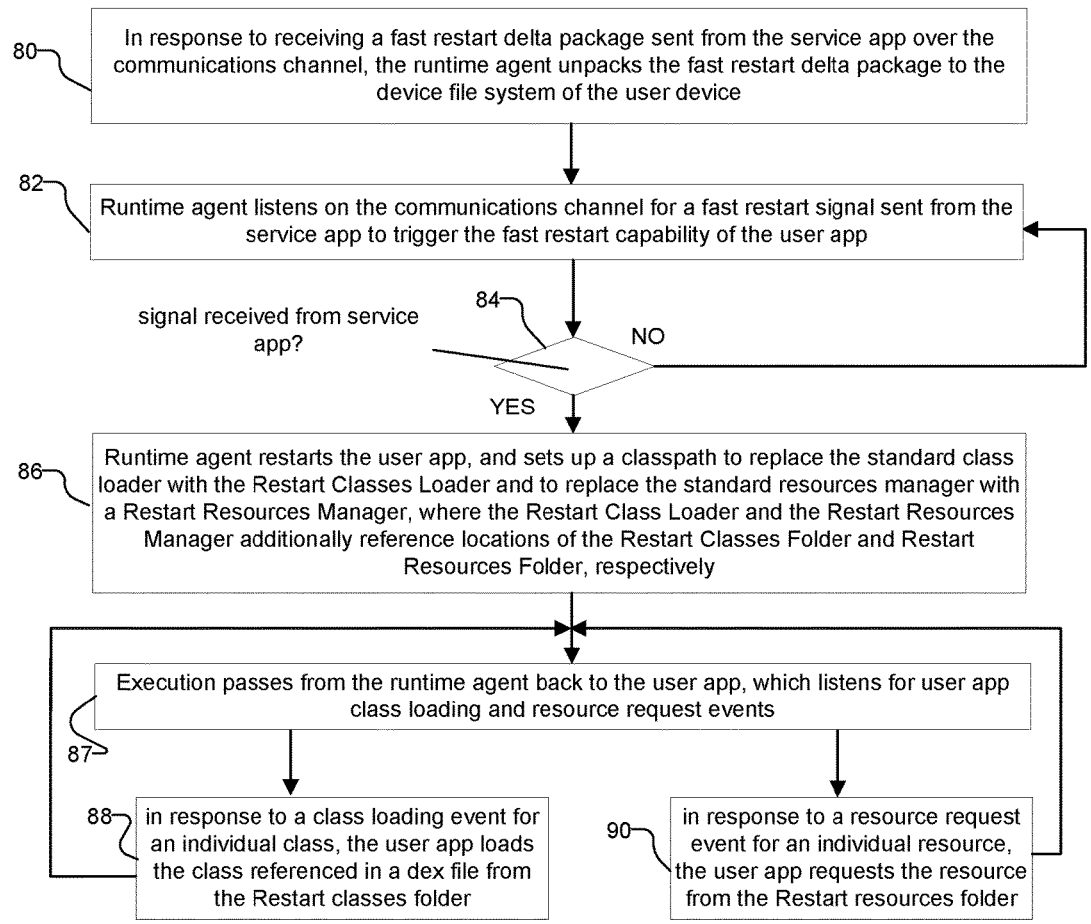
FIG. 2C is a flowchart showing how the runtime agent of the user app on the user device restarts the user app with the updates to the user app included in the restart archives sent to the user device, where the restart archives include changed classes and/or new classes of the user app and include changed resources and/or new resources of the user app.

The flowcharts of FIGS. 2A, 2B, and 2C collectively describe a method for configuring the user app 108 for a fast restart on a user device 175.

FIG. 2A describes the behavior of the service app 110 according to the preferred embodiment associated with an Android user device 175. In step 61, host file system 122 of the host system 150 hosts original classes 102 and original resources 112 of a user app 108, where the original classes 102 and original resources 112 are located in a workspace 31 of the host file system 122. According to step 62, the host system 150 creates an original user app APK 30 that includes dex files produced from the original classes 102 and includes the original resources 112.

Then, in step 64, the service app 110 copies the original classes 102 and original resources 112, adds classes that implement a runtime agent 109 within the user app 108, and creates a modified user app APK 32. The modified user app APK 32 includes the classes that implement the runtime agent 109 and the copies of the original classes 102 and original resources 112.

Figure 3:
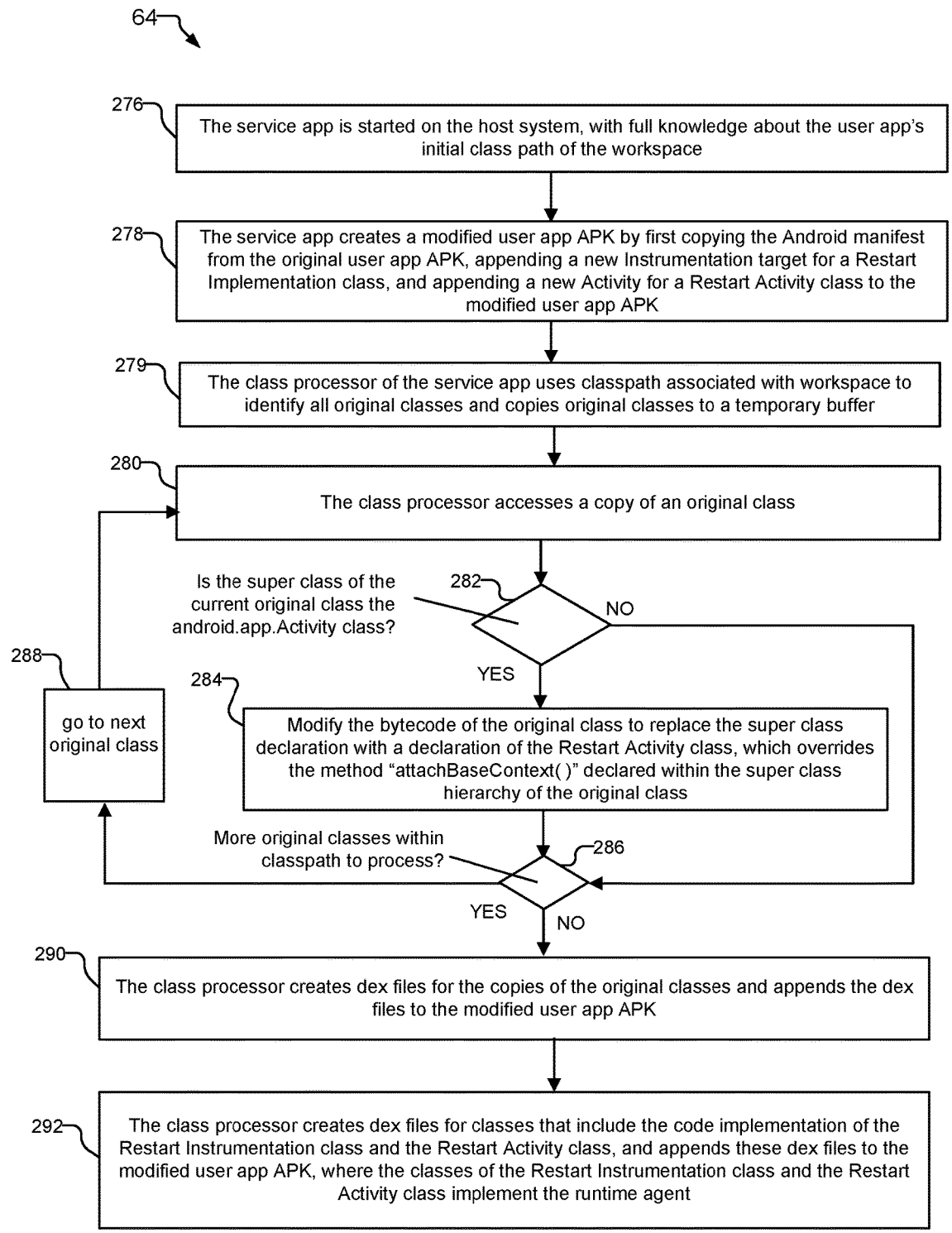
FIG. 3 shows more detail for the flowchart of FIG. 2A, showing the processing for creating and sending the modified user app archive to the user device.

FIG. 3 provides more detail for step 64 of FIG. 2A. The processing is associated with the classes and resources of the modified user app APK 32.

In step 276, the service app 110 is started on the host system 150, with full knowledge about the user app's initial class path of the workspace 31. In step 278, the service app 110 creates a modified user app APK 32 by first copying the Android manifest from the original user app APK 30, appending a new Instrumentation target for a Restart Implementation class 107, and appending a new Activity for a Restart Activity class 106 to the modified user app APK 32.

In step 280, the class processor 180 of the service app 110 accesses an original class 102 from the classpath associated with the workspace 31. In step 282, the class processor 180 tests if the super class of the current original class 102 is the android.app.Activity class. If this statement is true, the processing transitions to step 284. Otherwise, the processing transitions to step 286.

In step 284, the class processor 180 modifies the bytecode of the original class 102 to replace its super class declaration with a declaration of the Restart Activity class 106, which overrides the method "attachBaseContext( )" declared within the super class hierarchy of the original class 102. As a result, the original classes 102 that were originally subclasses of the system class "android.app.Activity" are now modified to become a subclass of the Restart Activity Class 106.

In a preferred implementation using the Jack tools suite, before creating the modified user app APK 32, the processing associated with bytecode injection can first trigger Javac compilation to produce a set of class files which the class processor 180 can process directly. The class processor 180 then performs the bytecode injection on the class files, converts the class files to dex files, and then includes the dex files in the modified user app APK 32.

In one implementation, when only the dex files that include the classes are available, the class processor 180 performs the injection by first locating the dex file that includes each class from the modified user app APK 32. Then, the class processor 180 decompiles the dex file to extract the class, injects the bytecode into the class, and recompiles the class back into the dex file format. Finally, the class processor 180 adds the dex file back to the modified user app APK 32. In another implementation where only the dex files that include classes are available, the class processor 180 performs the equivalent injections through manipulating the code directly within the dex files.

In step 286, the class processor 180 determines if there are any more original classes 102 within the classpath to process. If there are any more original classes 102, the next original class 102 is identified in step 288, and the method transitions back to step 280 to process the next original class. When there are no more original classes 102 to process as determined in step 286, the method transitions to step 290. At least some of the original classes traversed 102 upon conclusion of step 286 now include bytecode that declares the Restart Activity class 107 as a super class.

In step 290, the class processor 180 creates dex files for the original classes traversed in step 286 and appends the dex files to the modified user app APK 32. In step 292, the class processor 180 creates dex files for the classes that include the code implementation of the Restart Instrumentation class 107 and the Restart Activity class 106, and appends these dex files to the modified user app APK 32, where the classes of the Restart Instrumentation class 107 and the Restart Activity class 106 class implement the runtime agent 109.

Returning to FIG. 2A, in step 66 the service app 110 creates a communication channel 40 between the service app 110 and the user device 108 and sends the modified user app APK 32 to the user device 175 over the communications channel 40. In examples, a wireless or a hard-wired connection between the host system 150 and the user device 175 is utilized, and the communications channel 40 that the service app 110 creates is a data protocol for exchanging data, such as USB, Bluetooth, or WiFi, in examples.

In step 68, within the workspace 31 or within any other location on host system 150 indicated by the current class path, the service app 110 detects if there are any changed classes and/or new classes 104/103, and any changed resources and/or new resources 114/105.

Preferably, the classpath is selected to locate changes within the workspace 31 of the user app 108, and additionally outside the workspace 31. If there are no changes detected, the service app 110 continues to wait for detected changes. Otherwise, the method transitions to step 70 to process the detected updates to the user app 108.

In step 70, the service app 110 creates a restart classes archives (e.g. Restart classes APK 113) that includes changed classes and/or new classes 104/103 of the user app 108, creates a restart resources archive (e.g. Restart resources APK 116) that include changed and/or new resources 114/105, includes the restart classes archives 113 and/or restart resources archives 116 in a fast restart delta package 136, and sends the fast restart delta package 136 to the user device 175 for updating the user app 108 running on the user device 175.

Figure 5:
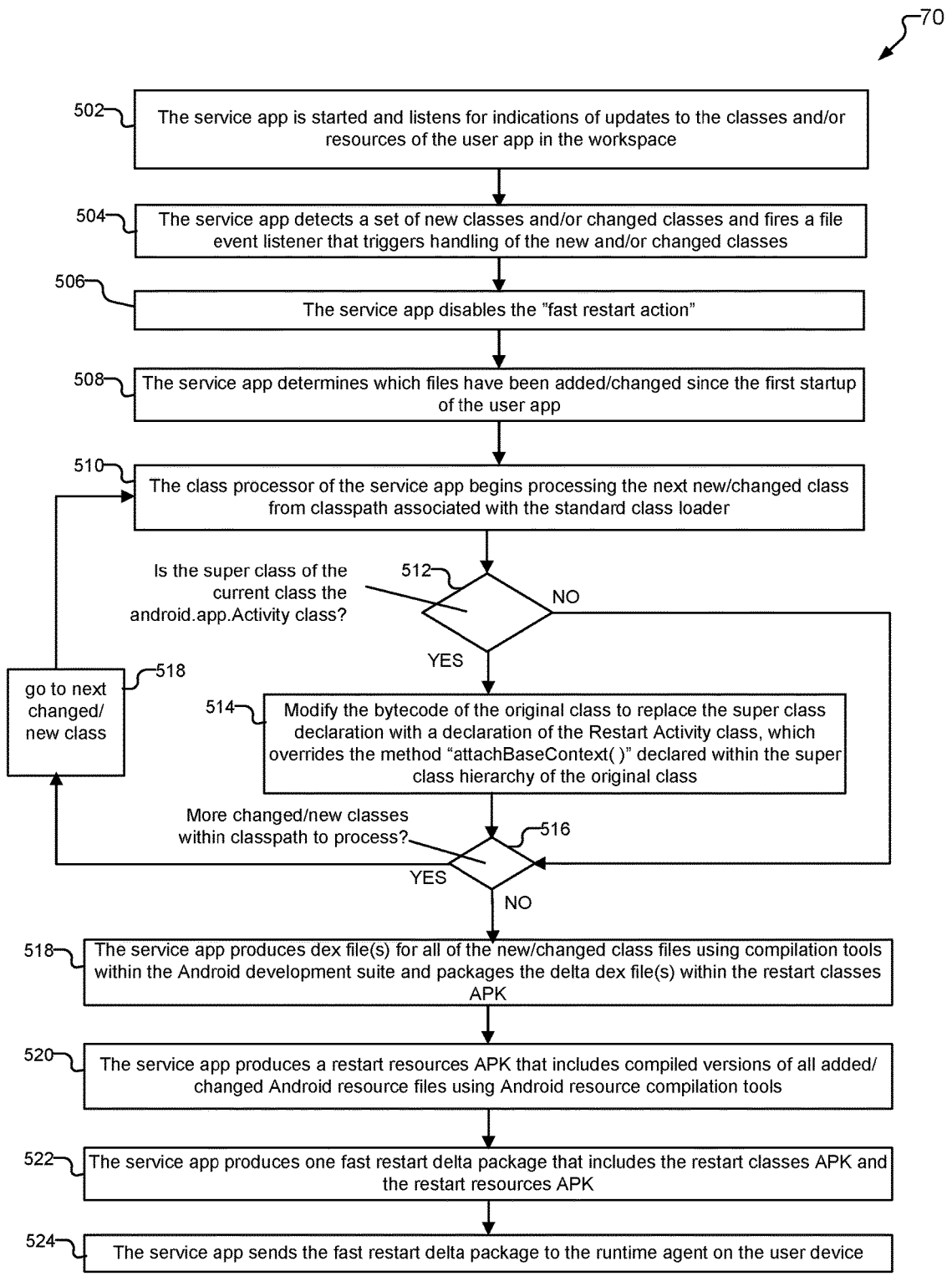
FIG. 5 is a flowchart that shows more detail for the flowchart of FIG. 2A, showing the processing for creating restart class archives and restart resource archives that include the updates to the user app, and sending the archives to the user device in a restart delta package.

FIG. 5 provides more detail for FIG. 2A step 70. The processing is associated with the new/changed classes 103/104 included within the restart classes APK 113 of the fast restart delta package 136.

In step 502, the service app 110 is started and listens for indications of updates to the classes (i.e. changed classes and/or new classes 104/103) and/or to the resources (i.e. changed resources and/or new resources 114/105) of the user app 108 in the workspace 31. In step 504, the service app 110 detects a set of new classes 103 and/or changed classes 104 and fires a file event listener that triggers handling of the new classes 103 and/or changed classes 104.

In step 506, the service app disables the "fast restart action." Then, in step 508, the service app 110 determines which files have been added/changed since the first startup of the user app 108. According to step 510, the class processor 180 begins processing the next unprocessed new/changed class 103/104 from the classpath associated with the standard class loader.

According to step 512, the class processor 180 tests if the super class of the current class is the android.app.Activity class. If this is true, the processing transitions to step 514. Otherwise, the processing transitions to step 516.

In step 514, the class processor 180 injects bytecode for the Restart Activity class 106, which overrides the method "attachBaseContext( )" declared within the super class hierarchy of the currently processed class. The injected bytecode replaces the "android.app.Activity" super class declaration of the current changed/new class 104/103 with a declaration of the Restart Activity class 107 as a super class of the current changed/new class 104/103. As a result, the new/changed classes 103/104 that were originally subclasses of the system class "android.app.Activity" are now modified to become a subclass of the Restart Activity Class 106.

In a preferred implementation using the Jack tools suite, before creating the restart classes APK 113 of each fast restart delta package 136, the processing associated with the bytecode injection can first trigger Javac compilation to produce a set of class files which the class processor 180 can process directly. The class processor 180 then performs the bytecode injection on the new/changed classes 103/104.

In another implementation, when only the dex files that include the classes are available, the class processor 180 performs the injection by first locating the dex file that includes each class from the restart classes APK 113 of each fast restart delta package 136. Then, the class processor 180 decompiles the dex file to extract the class, and injects the bytecode into each changed class 104 and/or new class 103.

In another implementation, when only the dex files that include the classes are available, the class processor 180 performs the injection through direct manipulation of the code within the dex files.

In step 516, the class processor 180 determines if there are any more changed/new classes 104/103 within the classpath to process. If there are any more changed/new classes 104/103, the next changed/new class 104/103 is identified in step 518, and the method transitions back to step 510 to process the next changed/new class 104/103. When there are no more changed/new class 104/103 to process as determined in step 516, the method transitions to step 518. At least some of the changed/new class 104/103 traversed upon conclusion of step 516 now include bytecode that declares the Restart Activity class 107 as a super class.

In step 518, the service app 110 produces the dex file(s) for all of the new/changed class files 103/104 using compilation tools within the Android development suite, and packages the dex file(s) within the restart classes APK 113. The service app 110 then produces a restart resources APK 116 that includes compiled versions of all new/changed Android resource files 105/114 using Android resource compilation tools, in step 520.

In step 522, the service app 110 produces one fast restart delta package 136 that includes the restart classes APK 113 and the restart resources APK 116. Finally, in step 524, the service app 110 sends the fast restart delta package 136 to the runtime agent 109 on the user device 175.

Returning to FIG. 2A, in step 72, in response to a developer action on the service app, the service app 110 sends a fast restart signal to the user device 175 over the communications channel 40 to enable the fast restart capability of the user app 108. This is indicated by arrow 26 in FIG. 1. Typically, the developer action is selection of a UI button presented by the service app 110 to the developer on the host system 150. In response to selection of the UI button by the developer, the service app 110 sends the fast restart signal to the user device 175. Upon conclusion of step 72, the method transitions back to the beginning of step 68 so that the service app 110 can detect and process more updates to the user app 108.

FIG. 2B describes details for deploying the initial instance of the user app 108 on the user device 175 via the modified user app APK 136 created by the service app 110.

In step 74, the user device 175 installs the modified user app APK 136 received from the service app 110. For an Android user device 175, this is accomplished by unpacking the dex files from the modified user app APK 136 to the device file system 123. The dex files are associated with the classes of the runtime agent 109, the original resources 112, and the original classes 102 of the user app 108 per the processing method of FIG. 3.

In step 76, the user virtual machine 50-2, via a standard class loader, loads the Restart Instrumentation class 107 included within the modified user app APK 136 and executes the Restart Instrumentation class 107 to begin initialization of the user app 108. According to step 78, the Restart Instrumentation class 107 starts an initial instance of the user app 108, which creates the runtime agent 109 within the user app 108, where the runtime agent 109 provides the fast restart capability of the user app 108.

Figure 4:
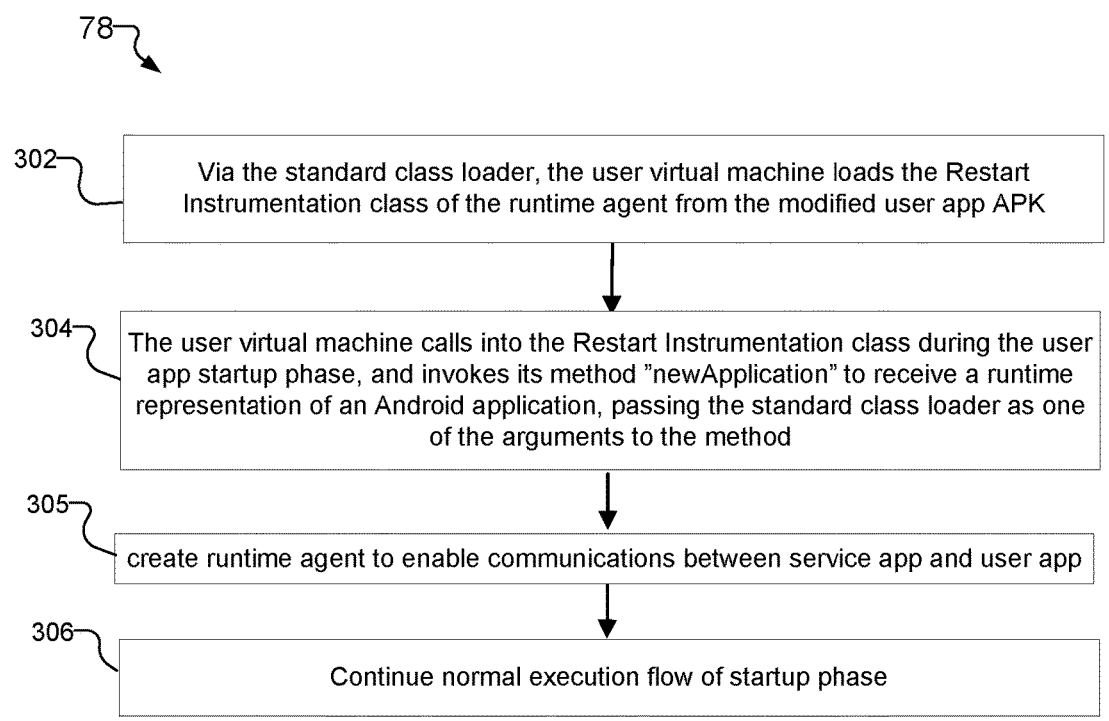
FIG. 4 is a flowchart showing more detail for the flowchart of FIG. 2B.

FIG. 4 provides more detail for step 78 of FIG. 2B.

In step 302, via the standard class loader, the user virtual machine 50-2 loads the Restart Instrumentation class 107 of the runtime agent 109 from the modified user app APK 32. According to step 304, the user virtual machine 50-2 calls into the Restart Instrumentation class 107 during the user app 108 startup phase, and invokes its method "newApplication" to receive a runtime representation of an Android application, passing the standard class loader as one of the arguments to the method. In step 305, the user app 108 creates the runtime agent 109 to enable communications between the service app 110 and the user app 108. Finally, in step 306, the user app 108 continues normal execution flow of its startup phase.

FIG. 2C provides more detail for the behavior of the runtime agent 109 on the user device 175.

In step 80, in response to receiving a fast restart delta package 136 sent from the service app 110 over the communications channel 40, the runtime agent 109 unpacks the fast restart delta package 136 to the device file system 123 of the user device 175.

Figure 6:
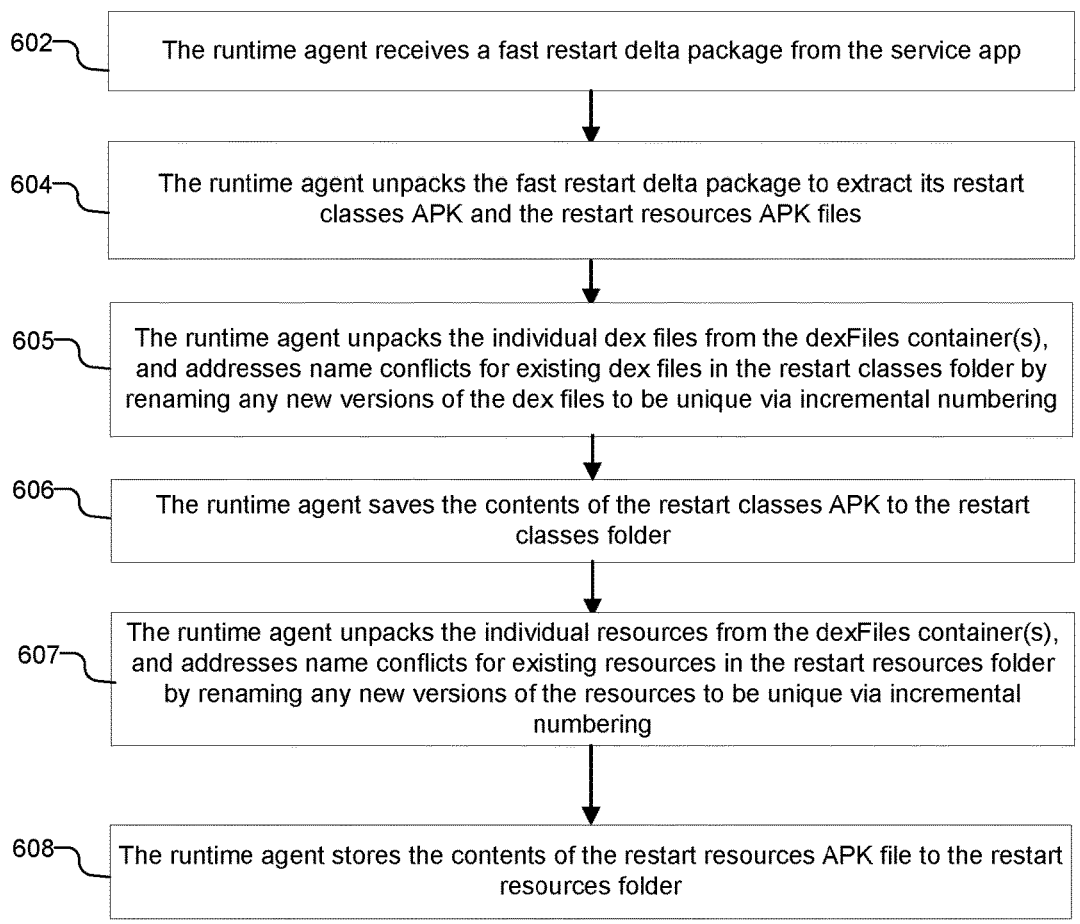
FIG. 6 is a flowchart that shows more detail for the flowchart of FIG. 2C, showing how the runtime agent handles the receiving of the restart delta package by unpacking the included restart class archives and restart resource archives to a device file system on the user device.

FIG. 6 provides more detail for step 80 of FIG. 2C.

In step 602, the runtime agent 109 receives a fast restart delta package 136 from the service app 110. In step 604, the runtime agent 109 unpacks the fast restart delta package 136 to extract its restart classes APK 113 and restart resources APK 116 files.

In step 605, the runtime agent 109 unpacks the individual dex files from the dexFiles container(s) 38, and addresses name conflicts for existing dex files in the restart classes folder 190 by renaming any new versions of the dex files to be unique via incremental numbering. According to step 606, the runtime agent 109 then saves the contents of the restart classes APK 113 to the restart classes folder 190.

In step 607, the runtime agent 109 unpacks the individual resources from the dexFiles container(s) 38, and addresses name conflicts for existing resources in the restart resources folder 192 by renaming any new versions of the resources to be unique via incremental numbering. According to step 608, the runtime agent 109 then stores the contents of the restart resources APK 116 file to the restart resources folder 192.

Returning to FIG. 2C, in step 82, the runtime agent 109 listens on the communications channel 40 for a fast restart signal sent from the service app 110 to trigger the fast restart capability of the user app 108.

In step 84, if the runtime agent 109 receives the fast restart signal from the service app 110, the processing transitions to step 86. Otherwise, the runtime agent 109 transitions back to step 82 to listen for the fast restart signal from the service app 110.

In step 86, the runtime agent 109 restarts the user app 108, and sets up a classpath to replace the standard class loader with the restart class loader 130 and to replace the standard resources manager with the restart resources manager 140, where the restart class loader 130 and the restart resource manager 140 additionally reference the locations of the restart classes folder 190 and restart resources folder 192, respectively.

Figure 7:
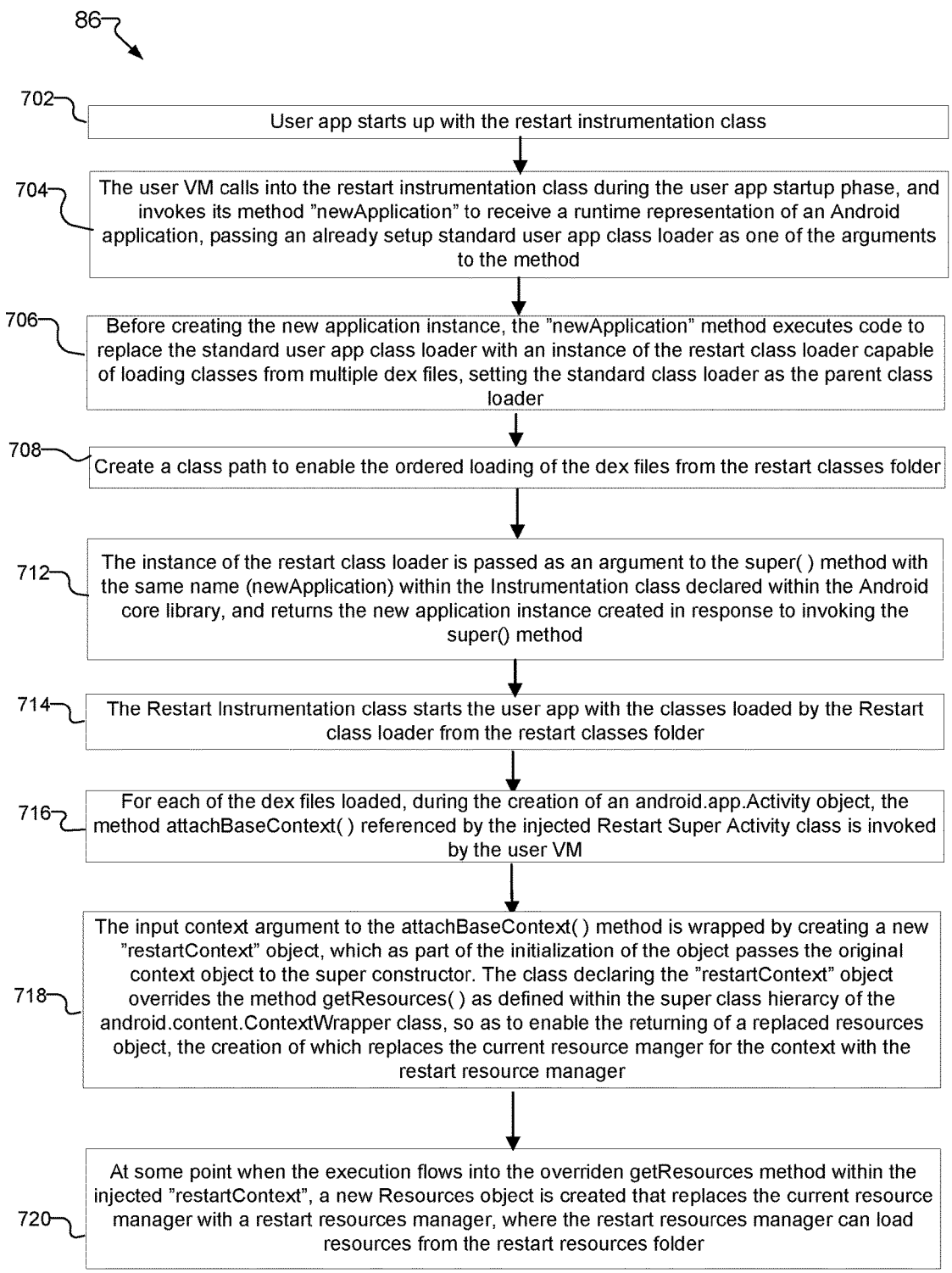
FIG. 7 is a flowchart that shows more detail for the flowchart of FIG. 2C, showing how the runtime agent replaces a standard class loader with a restart class loader and replaces a standard resources manager with a restart resources manager, where the restart class loader provides the ability to load the changed classes and/or new classes unpacked from the restart class archives, and where the restart resources manager provides the ability to request the changed and/or new resources unpacked from the restart resource archives.

FIG. 7 provides more detail for step 86 of FIG. 2C.

In step 702, the user app 108 starts up with the Restart Instrumentation class 107. In step 704, the user VM 50-2 calls into the Restart Instrumentation class 107 during the user 108 app startup phase, and invokes its method "newApplication" to receive a runtime representation of an Android application, passing an already setup standard user app class loader as one of the arguments to the method.

In step 706, before creating the new application instance, the "newApplication" method executes code to replace the standard user app 108 class loader with an instance of the restart class loader 130 capable of loading classes from multiple dex files, setting the standard class loader as the parent class loader. Then, in step 708, the runtime agent 109 creates a class path to enable the ordered loading of the dex files from the restart classes folder 190.

According to step 712, the instance of the restart class loader 130 is passed as an argument to the super( ) method with the same name (newApplication) within the Instrumentation class declared within the Android core library, and returns the new application instance created in response to invoking the super( ) method. The restart instrumentation class 107 then starts the user app 108 with the classes loaded by the restart class loader 130 from the restart classes folder 190, in step 714. This is indicated by arrow 22a in FIG. 1.

In step 716, for each of the dex files loaded, during the creation of an android.app.Activity object, the method attachBaseContext( ) referenced by the injected Restart Activity class 106 is invoked by the user VM 50-2.

In step 718, the input context argument to the attachBaseContext( ) method is wrapped by creating a new "restartContext" object, which as part of the initialization of the object passes the original context object to the super constructor. The class declaring the "restartContext" object overrides the method getResources( ) as defined within the super class hierarcy of the android.content.ContextWrapper class, so as to enable the returning of a replaced resources object, the creation of which replaces the current resources manager for the context with the restart resource manager 140.

Finally, in step 720, at some point when the execution flows into the overriden getResources method within the injected "restartContext", a new Resources object is created that replaces the current resource manager with the restart resources manager 140, where the restart resources manager 140 can request/load resources from the restart resources folder 192. This is indicated by arrow 22b in FIG. 1.

Returning to FIG. 2C, in step 87, execution passes from the runtime agent 109 back to the user app 108, which listens for user app class loading and resource request events. These events do not necessarily follow an ordered sequence. As a result, the processing of the class loading and the resource request events are typically performed in parallel in steps 88 and 90. Step 88 is executed as many times as the number of classes loaded by the user app 108, and step 90 is executed as many times as the number of resources requested by the user app 108.

In step 88, in response to a class loading event for an individual class, the user app 108 loads the class referenced in a dex file from the restart classes folder 130. This is also indicated by arrow 22a in FIG. 1.

Figure 8:
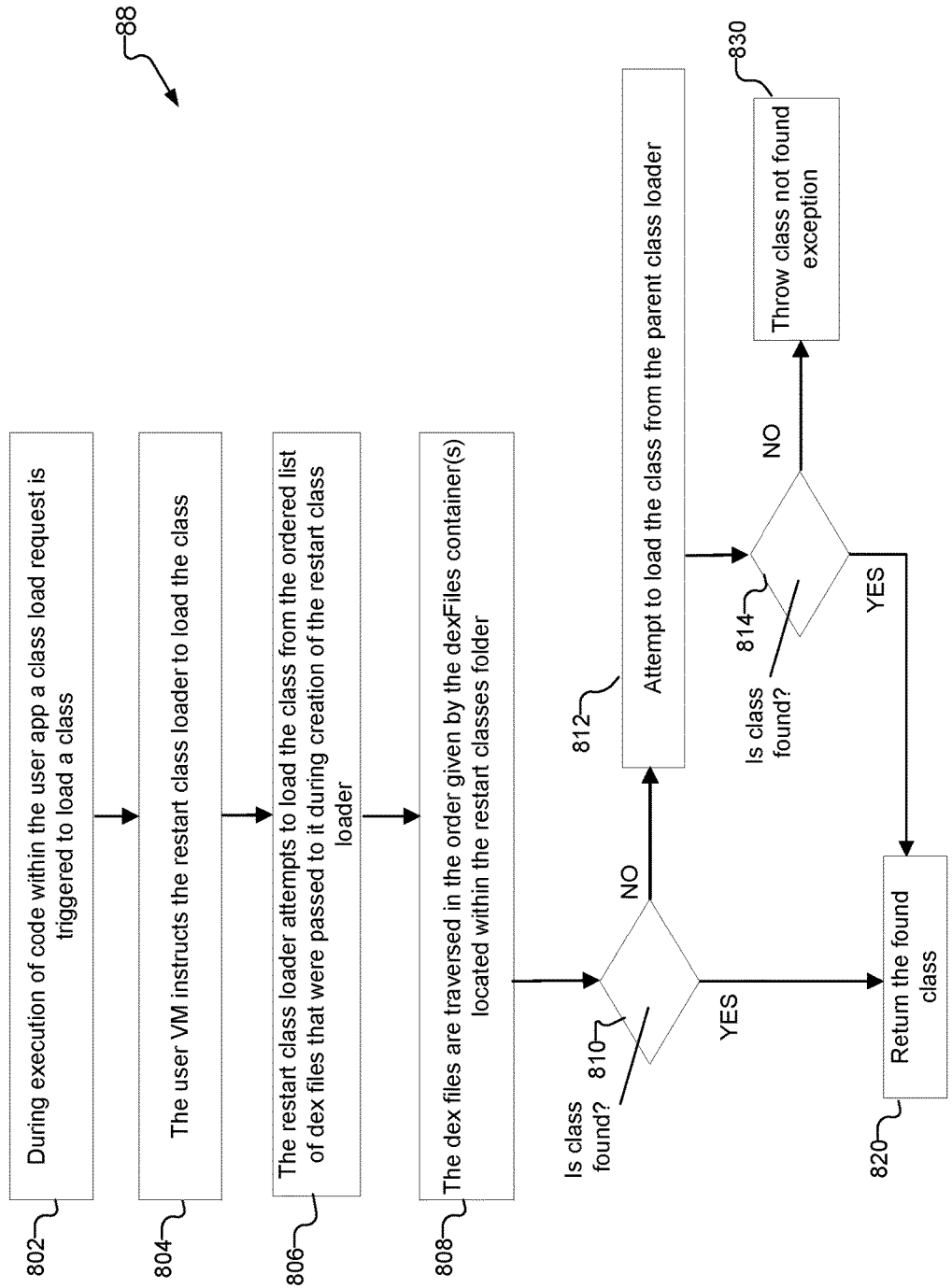
FIG. 8 is a flowchart showing more detail for the flowchart of FIG. 2C, showing how the runtime agent of FIG. 2C loads the changed classes and/or new classes during a restart of the user app.

FIG. 8 provides more detail for FIG. 2C, step 88.

In step 802, during execution of code within the user app 108, a class load request is triggered to load a class, and in step 804 the user VM 50-2 instructs the restart class loader 130 to load the class. The restart class loader 130 attempts to load the class from the ordered list of dex files that were passed to it during creation of the restart class loader 130 in step 806.

In step 808, the dex files are traversed in the order given by the dexFiles container(s) 38 located within the restart classes folder 130. According to step 810, if the class is found, the restart class loader 130 returns the found class in step 820. Otherwise, the processing transitions to step 812.

When the class was not found in step 810, the restart class loader 130 attempts to load the class from the parent class loader in step 812. The parent class loader uses the initial classpath utilized when the user app 108 was first started on the user device 175. If the class is found in step 814, the restart class loader 130 returns the found class in step 820.

Otherwise, the restart class loader 130 throws a "class not found" exception in step 830.

Returning to FIG. 2C, in step 90, in response to a resource request event for an individual resource, the user app 108 requests the resource from the restart resources folder 140. This is also indicated by arrow 22b in FIG. 1.

Figure 9:
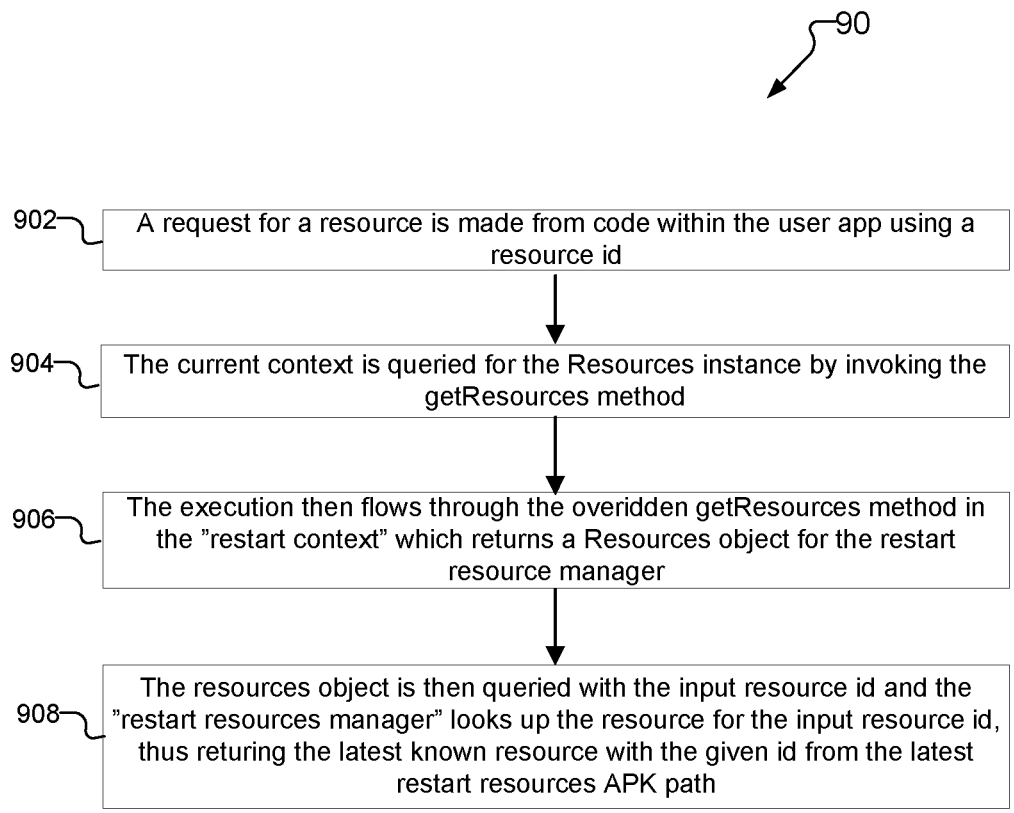
FIG. 9 is a flowchart showing more detail for the flowchart of FIG. 2C, showing how the runtime agent of FIG. 2C requests the changed resources and/or new resources during a restart of the user app.

FIG. 9 provides more detail for FIG. 2C, step 90.

In step 902, a request for a resource is made from code within the user app 108 using a resource id. The current context is queried for the Resources instance by invoking the getResources method, in step 904. According to step 906, the execution then flows through the overridden getResources method in the "restart context" which returning a Resources object for the restart resource manager 140.

In step 908, the resources object is then queried with the input resource id and the restart resources manager 140 looks up the resource for the input resource id, thus returning the latest known resource with the given id from the latest restart resource APK 116 path.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for updating a user app deployed on a user device during development of the user app, comprising:
providing the user app with restart functionality for restarting a currently running instance of the user app;
creating restart classes archives for changed classes or new classes with respect to classes of the currently running instance of the user app and sending the restart classes archives to the user device;
creating restart resources archives for changed resources or new resources with respect to resources of the currently running instance of the user app and sending the restart resources archives to the user device; and
the currently running instance of the user app invoking the restart functionality by restarting using the changed classes or new classes from the received restart classes archives and requesting the changed resources or new resources from the received resources archives on the user device, in which a runtime agent of the currently running instance of the user app deployed on the user device unpacks the changed classes or new classes, and unpacks the changed resources or new resources, to a device file system of the user device and, in response to receiving a restart signal from a host system, the runtime agent reloads the changed classes or new classes and requests the changed resources or new resources from the device file system;
wherein the changed classes or new classes and the changed resources or new resources constitute a latest version of the user app during development.

2. The method of claim 1, further comprising creating the restart classes archives for the changed classes or new classes of the user app in response to detecting the changed classes or new classes on a host system.

3. The method of claim 1, further comprising creating the restart resources archives for the changed resources or new resources of the user app in response to detecting the changed resources or new resources on a host system.

4. The method of claim 1, further comprising detecting the changed classes or new classes of the user app and detecting the changed resources or new resources of the user app, in response to a user-driven triggering event, or in response to receiving events associated with changes to a workspace that includes the classes and resources of the user app.

5. The method of claim 1, wherein a runtime agent of an initial instance of the user app deployed on the user device accomplishes the reloading of the changed classes or new classes from the received restart classes archives and accomplishes the requesting of the changed resources or new resources from the received resources archives on the user device.

6. The method of claim 1, further comprising:
creating a modified user app archive including original classes and original resources of the user app and including classes of a runtime agent of the user app;
sending the modified user app archive to the user device; and
deploying a modified user app on the user device via the modified user app archive to accomplish deploying of an initial instance of the user app on the user device.

7. The method of claim 6, further comprising deploying a runtime agent of the user app on the user device from the classes of the runtime agent, wherein the runtime agent enables the updating of the user app on the user device after the deployment of the initial instance of the user app on the user device.

8. The method of claim 6, further comprising:
including a new Android Instrumentation target for a Restart Implementation class within the classes of the runtime agent; and
including a replacement android.app.Activity class within the classes of the runtime agent.

9. The method of claim 6, further comprising:
replacing bytecode of declarations within the original classes that declare android.app.Activity as a super class, with bytecode that declares a replacement restart activity class of the runtime agent as a super class, wherein the replacement restart activity class overrides a method "attachBaseContext( )" declared within a super class hierarchy of each of the original classes.

10. The method of claim 1, further comprising:
replacing bytecode of the changed classes or new classes that declare android.app.Activity as a super class, with bytecode that declares a replacement restart activity class of a runtime agent as a super class, wherein the injected restart activity class overrides a method "attachBaseContext( )" declared within a super class hierarchy of each of the changed or new classes.

11. The method of claim 1, further comprising updating a user app deployed on an Android user device.

12. The method of claim 1, further comprising the currently running instance of the user app invoking the restart functionality without modifying source code, build files and/or projects files of the user app.

13. A method for a runtime agent of a user app that enables updating of the user app on an Android user device during development of the user app, the method comprising:
including classes that implement the runtime agent in a modified archive of the user app, wherein the runtime agent includes restart functionality for restarting a currently running instance of the user app;
modifying classes of an initial instance of the user app to replace declarations of "android.app.Activity" as a super class with declarations of a replacement restart activity class of the runtime agent as a super class;
appending resources of the initial instance of the user app and the modified classes of the initial instance of the user app to the modified archive of the user app; and deploying the initial instance of the user app and the runtime agent on the user device via the modified archive of the user app, the runtime agent replacing a standard class loader with a restart class loader and replacing a standard resources manager with a restart resources manager, wherein the runtime agent invokes the restart functionality by restarting the currently running instance of the user app using changed classes or new classes loaded by the restart class loader and changed resources or new resources requested by the restart resources manager, and the changed classes or new classes and the changed resources or new resources constitute a latest version of the user app during development, which includes:

determining changed classes or new classes of the user app and determining changed resources or new resources of the user app, modifying the changed classes or new classes to replace declarations of "android.app.Activity" as a super class with declarations of a replacement restart activity class of the runtime agent as a super class, including the changed classes or new classes and the changed resources or new resources in restart archives, and deploying the restart archives on the user device to update the user app with the changed classes or new classes and with the changed resources or new resources.

14. A system for updating a user app during development of the user app, comprising:

a user device for executing the user app, wherein the user app is provided with restart functionality for restarting a currently running instance of the user app; and a host computer system creating restart classes archives for changed classes or new classes with respect to classes of a currently running instance of the user app and sending the restart classes archives to the user device, the host system creating restart resources archives for changed resources or new resources with respect to resources of the currently running instance of the user app and sending the restart resources archives to the user device; and wherein the user device executes the user app, the currently running instance of the user app invokes the restart functionality by restarting using the changed classes or new classes from the received restart classes archives and requesting the changed resources or new resources from the received resources archives on the user device, in which a runtime agent of an initial instance of the user app deployed on the user device unpacks the changed classes or new classes and unpacks the changed resources or new resources to a device file system of the user device and in response to the runtime agent receiving a restart signal from the host system, the runtime agent reloads the changed classes or new classes from the device file system and requests the changed resources or new resources from the device file system, and wherein the changed classes or new classes and the changed resources or new resources constitute a latest version of the user app during development.

15. The system of claim 14, wherein a service app of the host system creates the restart classes archives for the changed classes or new classes of the user app in response to detecting the changed classes or new classes on the host system.

16. The system of claim 14, wherein a service app of the host system creates the restart resources archives for the changed resources or new resources of the user app in response to detecting the changed resources or new resources on the host system.

17. The system of claim 14, wherein a runtime agent of an initial instance of the user app deployed on the user device accomplishes the reloading of the changed classes or new classes from the received restart classes archives and accomplishes the requesting of the changed resources or new resources from the received resources archives on the user device.

18. The system of claim 14, wherein the host system additionally creates a modified user app archive that includes original classes and original resources of the user app and includes classes of a runtime agent of the user app, sends the modified user app archive to the user device, and deploys a modified user app on the user device via the modified user app archive to accomplish deploying of an initial instance of the user app on the user device.

19. The system of claim 18, wherein the host system deploys a runtime agent of the user app on the user device from the classes of the runtime agent, wherein the runtime agent enables the updating of the user app on the user device after the deployment of the initial instance of the user app on the user device.

20. A method for redeploying a user app on a user device during development of the user app, the method comprising:

creating a modified user app archive that includes original classes and original resources of the user app and includes classes of a runtime agent of the user app;

injecting bytecode into at least some of the original classes to create modified versions of at least some of the original classes, where the bytecode references the classes of the runtime agent;

including the modified versions of the at least some of the original classes in the modified user app archive;

deploying an initial instance of the user app and deploying the runtime agent on the user device via the modified user app archive; and the runtime agent of the user app restarting a currently running instance of the user app with changed classes or new classes of the user app included in restart classes archives sent to the user device and with changed resources or new resources of the user app included in restart resources archives sent to the user device, in which the runtime agent unpacks the changed classes or new classes from the restart classes archives to a device file system of the user device and reloads the user app with the changed classes or new classes from the device file system and the runtime agent unpacks the changed resources or new resources from the restart classes archives to a device file system of the user device, and requests the changed resources or new resources from the device file system, wherein the changed classes or new classes and changed resources or new resources constitute a latest version of the user app during development.

21. The method of claim 20, further comprising injecting bytecode into at least some of the changed classes or new classes to create modified versions of at least some of the changed classes or new classes, where the bytecode references the classes of the runtime agent.

* * * * *